US012764090B2

(12) United States Patent
Komu et al.

(10) Patent No.: US 12,764,090 B2
(45) Date of Patent: Oct. 13, 2026

(54) SECURE MULTICLOUD CONNECTIVITY FOR CLOUD-NATIVE APPLICATIONS

(71) Applicant: TELEFONAKTIEBOLAGET LM ERICSSON (PUBL), Stockholm (SE)

(72) Inventors: Miika Komu, Helsinki (FI); Patrik Salmela, Espoo (FI); Tero Kauppinen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 182 days.

(21) Appl. No.: 18/287,109

(22) PCT Filed: Apr. 15, 2021

(86) PCT No.: PCT/IB2021/053134
§ 371 (c)(1),
(2) Date: Oct. 16, 2023

(87) PCT Pub. No.: WO2022/219375
PCT Pub. Date: Oct. 20, 2022

(65) Prior Publication Data

US 2024/0195779 A1 Jun. 13, 2024

(51) Int. Cl.
*H04L 61/2589* (2022.01)
*H04L 41/40* (2022.01)

(52) U.S. Cl.
CPC .......... *H04L 61/2589* (2013.01); *H04L 41/40* (2022.05)

(58) Field of Classification Search
CPC . H04L 61/2589; H04L 41/40; H04L 61/2514; H04L 61/2575; G06F 9/45558
See application file for complete search history.

(56) References Cited

U.S. PATENT DOCUMENTS

| | | | | |
|---|---|---|---|---|
| 10,623,390 | B1 * | 4/2020 | Rosenhouse | H04L 67/10 |
| 10,764,244 | B1 | 9/2020 | Mestery et al. | |
| 2017/0214550 | A1 | 7/2017 | Kumar | |
| 2020/0112487 | A1 | 4/2020 | Inamdar | |
| 2021/0328913 | A1 * | 10/2021 | Nainar | H04L 45/745 |
| 2021/0365357 | A1 * | 11/2021 | Gamliel | G06F 11/3692 |
| 2022/0263805 | A1 * | 8/2022 | Ray | H04L 67/10 |

(Continued)

FOREIGN PATENT DOCUMENTS

| | | | |
|---|---|---|---|
| CN | 111373715 | A | 7/2020 |
| WO | 2019246331 | A1 | 12/2019 |
| WO | 2020251828 | W | 12/2020 |

OTHER PUBLICATIONS

Anonymous: 5G and the Cloud-A 5G Americas White Paper, Dec. 31, 2019 (Dec. 31, 2019), pp. 1-53, XP055844938.

(Continued)

*Primary Examiner* — Soe Hlaing
(74) *Attorney, Agent, or Firm* — Ericsson Inc.

(57) ABSTRACT

A first edge node can communicate an address candidate for either a first sidecar container of the first edge node or a second sidecar container of a second edge node with a master orchestrator. The first edge node can then communicate traffic between a first application container of the first edge node and a second application container of the second edge node via a connection between the first sidecar container and the second sidecar container using the address candidate.

23 Claims, 5 Drawing Sheets

(56) References Cited

U.S. PATENT DOCUMENTS

2023/0300030 A1* 9/2023 Chen .................. H04L 41/0893
709/223

OTHER PUBLICATIONS

Rosenberg et al., Interactive Connectivity Establishment (ICE): A Protocol for Network Address Translator (NAT) Traversal for Offer/Answer Protocols', rfc5245.txt11, Internet Engineering Task Force, IETF; Standard, Apr. 30, 2010 (Apr. 30, 2010), pp. 1-117.

* cited by examiner

SECURE MULTICLOUD CONNECTIVITY FOR CLOUD-NATIVE APPLICATIONS

This application is a 371 of International Application No. PCT/IB2021/053134, filed on Apr. 15, 2021, the disclosure of which is fully incorporated herein by reference.

TECHNICAL FIELD

The present disclosure relates generally to communications, and more particularly to communication methods and related devices and nodes supporting wireless communications.

BACKGROUND

FIG. 1 illustrates an example of a wireless communications network (e.g., a cellular communications network, a new radio ("NR") network, or a 5th Generation ("5G") access network) including a network node 110 (e.g., a 5G base station ("gNB")), multiple communication devices 120 (also referred to as user equipment ("UE")), and a core network 130.

A Kubernetes-based cluster is network address translated ("NATed") internally, but from the outside access to the NATed containers can be achieved by mapping a public internet protocol ("IP") address and a transport-layer port either directly to a container or indirectly by exposing a load balancer via an ingress controller. In some examples, to connect containers located in two different clusters, the two clusters need to open transport ports at public IP addresses and associate them somehow to each other. In other examples, a virtual private network ("VPN") connection is opened between the two clusters, for instance, using a software-defined wide area network ("SD-WAN") solution, in order to save transport layer port numbers. In this example, each side would need to open only one transport port associated with a public IP address. A VPN connection can be configured manually (e.g., in an Istio framework), however, automated commercial products do exist. SD-WAN from Cisco and Submariner.io can connect two clouds using a VPN-based solution, and Network Service Mesh provides optionally VPN-based connectivity.

In some examples, peer-to-peer communication is handled in environments where there are NATs, with Interactive Connectivity Establishment ("ICE") being the typical go-to solution, and it works even when both two communicating end-points (e.g., applications) are behind NATs. ICE requires external infrastructure (with public IP addresses) in the form of Session Traversal of User Datagram Protocol through NAT ("STUN") and Traversal Using Relays around NAT ("TURN") servers. STUN servers are freely available, and they allow the end-point to discover its public Internet facing IP address+port pair, and TURN servers can be used for triangular routing of the traffic when direct NAT traversal has failed. In ICE, two communicating end-points start by discovering their public facing IP address and port pairs (so called address "candidates") from STUN servers, and optionally register to a TURN server in order to obtain a relayed address candidate. Then, the end-points need to exchange somehow their address candidates with each other, which is not defined in the ICE specifications, but rather application has to deal with this on its own—besides address candidate exchange, both of the two communication applications needs to be modified to support an ICE library, and the application protocol also needs to be modified to disambiguate ICE control plane from application-specific traffic. After this, the end-points start a process to discover a working pair of address candidates through the NATs. If this process succeeds, the end-points have obtained direct end-to-end connectivity with each other. Otherwise, they resort to triangular routing via the TURN relays.

Teredo is an alternative to ICE. Unlike ICE, it does not require modifications to the application source code. However, Teredo requires that the application supports IPv6-based connectivity despite the application traffic actually being tunneled over IPv4.

In Kubernetes-based clouds, cloud-native applications can be deployed using two helper/utility containers, thus making the actual application container focus on the main task at hand. The first helper container is called an init container, which configures networking properties such as routes and Domain Name System ("DNS") rules in the application container before Kubernetes sets the application into running state. The second helper is called "sidecar", which can be used, for example, to proxy some or all traffic of the actual application container. For instance, the sidecar can modify or drop application traffic. Thus, for example, security can be terminated in the sidecar. This way, the application container only implements the bare minimum networking in order to establish a connection to the sidecar, which then takes care of more complex networking features. The main difference between "init" and "sidecar" containers is that the "init" container runs before the application container is actually started, whereas the "sidecar" container runs in parallel to the application. This design choice stems partly from the desire to simplify application development in order to avoid integrating complex networking functions into the actual application (i.e., separation of concerns).

A Kubernetes application container is usually deployed using a so called manifest which acts as kind of a "recipe" for starting the application. A manifest can include information about the container image type, how many replicas of the application to start, whether init and/or sidecars are needed or not, the usage of load balancers, and details about the network configuration, among many other things. In the context of multiclusters, the manifest can also include information about the cluster where the container(s) is to be started, which is an extra feature provided by Federated Kubernetes. Alternatively, this functionality can also be supported by a Topology and Orchestration Specification for Cloud Applications ("TOSCA")-based implementation.

SUMMARY

According to some embodiments, a method of operating a first edge node in a communications network that includes a master orchestrator) and a second edge node is provided. The method includes communicating an address candidate for either a first sidecar container of the first edge node or a second sidecar container of the second edge node with the master orchestrator. The method further includes communicating traffic between a first application container of the first edge node and a second application container of the second edge node via a connection between the first sidecar container and the second sidecar container using the address candidate.

According to other embodiments, a method of operating a master orchestrator in a communications network that includes a first edge node and a second edge node is provided. The method includes receiving a first address candidate for a first sidecar container from the first edge node. The method further includes receiving a second address candidate for a second sidecar container from the second edge node. The method further includes, in response to receiving the first address candidate, transmitting the first address candidate to the second edge node. The method further includes, in response to receiving the second address candidate, transmitting the second address candidate to the first edge node.

According to other embodiments, a network node, computer program, or computer program product is provided for performing one of the above methods.

Various embodiments described herein allow the connection of containers in two (or more) Kubernetes edge clusters together in a secure way, across layered NATs.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
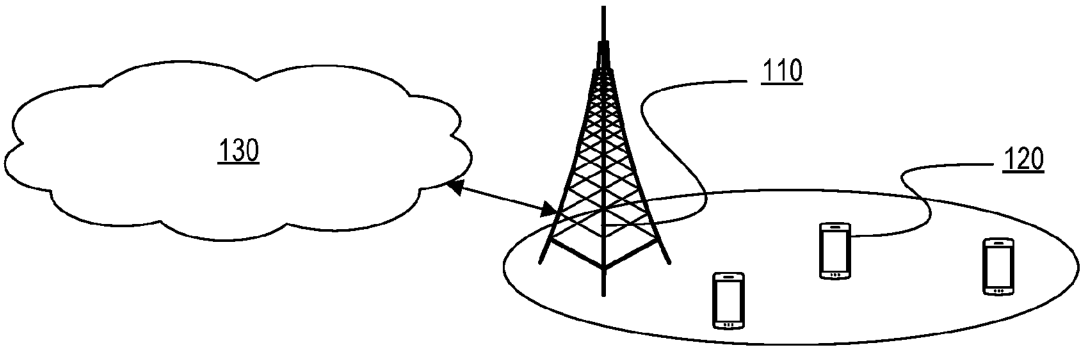
FIG. 1 is a block diagram illustrating an example of 5th Generation ("5G") network architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Opening transport-layer ports for individual containers manually can be a tedious and error prone task, especially since containers can be destroyed and initialized quite often in the cloud-native era. In some examples, VPN-based connectivity can be implemented manually. In other examples, VPN-based connectivity can be automatically implemented, for example using SD-WAN. However, SD-WAN can be too heavy-weight for small edge clouds, which may not even have public addresses to begin with. In other examples, submariner.io can be used but assumes a separate broker cloud with a public address, which could become a bottleneck for communications if used for triangular routing via the broker cloud. In other examples, Network Service Mesh can be used but assumes that the clusters to be connected do not have any NAT between them, which is an unrealistic assumption in the case of edge clouds. Accordingly, the above examples essentially assume that the site has a public IP addresses.

Modifying applications to support ICE can be complex and can require extra effort for each application separately. Teredo requires the application to support IPv6, which is not feasible in all scenarios.

Small edge clouds and device/IoT clouds may not have public IP addresses associated with them and such clouds can be located behind multiple, cascading NATs. To avoid triangular routing of the data plane via another site equipped with a public address (e.g., might occur in submariner.io solution), various embodiments herein describe connecting edge clouds directly to each other (and to central clouds) using an ICE protocol for NAT traversal and optionally some secure transport (e.g., Transport-Layer Security or Virtual Private Network). In some embodiments, the clouds to be connected are based on Kubernetes so that the ICE based NAT traversal is handled using so called Init containers and sidecars that hide the complexity of NAT traversal procedures and separation of ICE protocol from the application payload from the actual application container. The connectivity solution can both be used to connect individual containers together and groups of containers.

In some embodiments, Linux containers located in administratively different Kubernetes clusters can be interconnected. In additional or alternative embodiments, the proposed connectivity works even in the case of multiple cascading NATs at both sides. In additional or alternative embodiments, the application itself does not need to be modified (e.g., with ICE or VPN logic). In additional or alternative embodiments, the proposed connectivity avoids triangular routing of the data plane by establishing direct end-to-end connectivity. In additional or alternative embodiments, a process is described for connecting groups of containers instead of individual containers. In additional or alternative embodiments, a process is proposed that allows leveraging existing infrastructure for ICE (e.g., existing STUN and TURN servers) instead of deploying and maintaining an independent infrastructure. In additional or alternative embodiments, tunneling overhead can be avoided, thereby increasing maximum transmission unit ("MTU"), which can be important for 5G/6G products.

Figure 4:
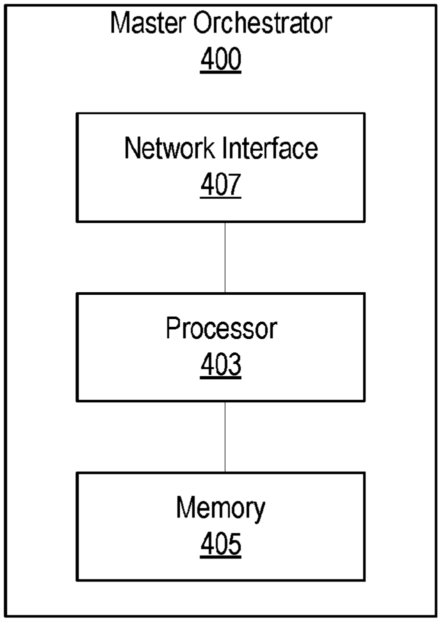
FIG. 4 is a block diagram illustrating an example of a master orchestrator according to some embodiments of inventive concepts.

FIG. 4 is a block diagram illustrating elements of a master orchestrator 400 of a communication network (e.g., a cloud network and/or cellular communications network) according to embodiments of inventive concepts. Master orchestrator 400 can be an example of the master orchestrator 210 of FIG. 2. As shown in FIG. 4, the master orchestrator 400 may include network interface circuitry 407 (also referred to as a network interface) configured to provide communications with other nodes of the communication network. The master orchestrator 400 may also include a processing circuitry 403 (also referred to as a processor) coupled to the network interface circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the master orchestrator 400 may be performed by processing circuitry 403 and/or network interface circuitry 407. For example, processing circuitry 403 may control network interface circuitry 407 to transmit communications through network interface circuitry 407 to one or more other network nodes and/or to receive communications through network interface circuitry from one or more other network nodes. Moreover, modules may be stored in memory 405, and these modules may provide instructions so that when instructions of a module are executed by processing circuitry 403, processing circuitry 403 performs respective operations.

Figure 5:
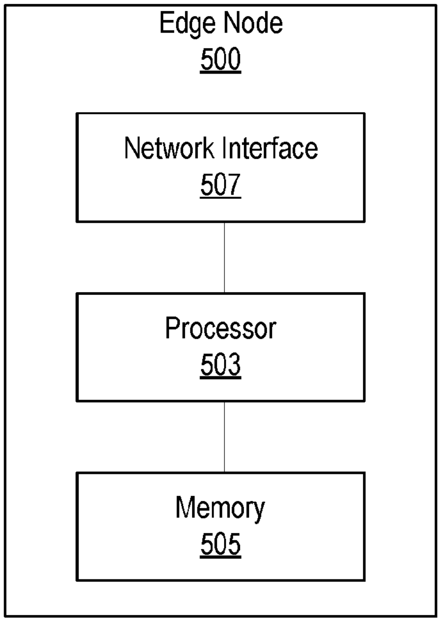
FIG. 5 is a block diagram illustrating an example of an edge node according to some embodiments of inventive concepts.

FIG. 5 is a block diagram illustrating elements of an edge node 500 of a communication network (e.g., a cloud network and/or cellular communications network) according to embodiments of inventive concepts. As shown in FIG. 5, the edge node 500 may include network interface circuitry 507 (also referred to as a network interface) configured to provide communications with other nodes of the communication network. The edge node 500 may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the edge node 500 may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations.

Figure 2:
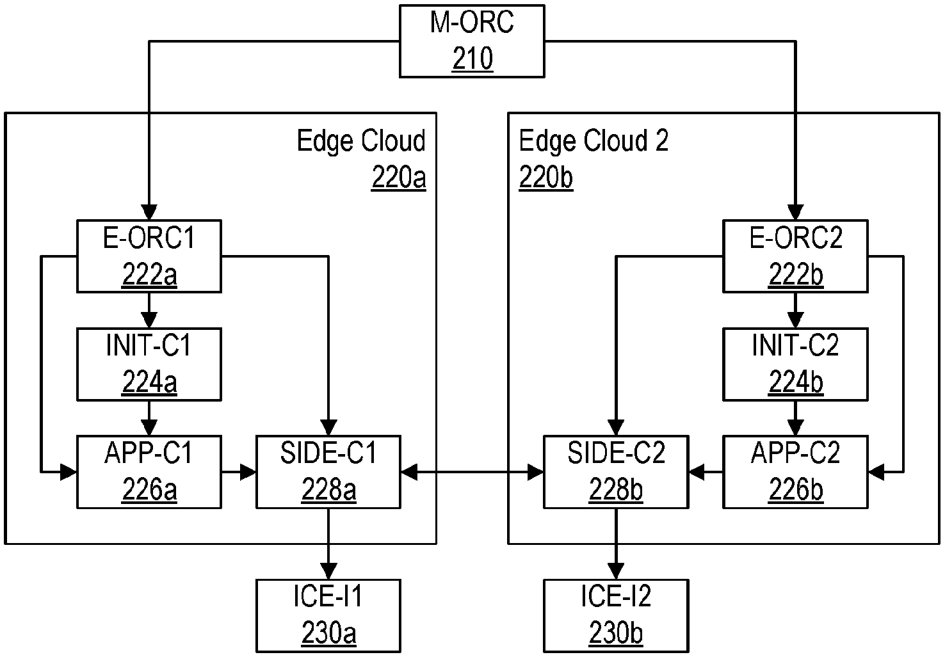
FIG. 2 is a block diagram illustrating an example of a connection between two edge nodes according to some embodiments of inventive concepts.

Edge node 500 can be an example of either Edge Cloud 1 220*a* or Edge Cloud 2 220*b* of FIG. 2. Accordingly, edge node 500 can include one or more of an edge orchestrator ("E-ORC"), init container ("INIT-C"), application container ("APP-C"), or sidecar container ("SIDE-C").

FIG. 2 provides an architecture view of some embodiments. Master Orchestrator ("M-ORC") 210 manages two edge clusters (Edge Cloud 1 220*a* and Edge Cloud 2 220*b*) indirectly using their associated Edge Orchestrators (Edge Orchestrator 1 ("E-ORC1") 222*a* and Edge Orchestrator 2 ("E-ORC2") 222*b*). In some examples, the M-ORC 210 can be assumed to have a publicly reachable address (or at least one transport-layer port) in which case it can be deployed to a central cloud. In other examples, if Edge Clouds 220*a-b* have a publicly reachable address, M-ORC 210 can also be deployed there. M-ORC 210 and E-ORCs 222*a-b* can use, for example, TOSCA and/or Federated Kubernetes for multi-cluster management. For example, in Edge Cloud 1 220*a*, E-ORC1 222*a* can manage three types of containers: before starting the first actual application container ("APP-C1") 226*a*, it spins up a first Init Container ("INIT-C1") 224*a* that sets up routing rules in APP-C1 226*a* so that all communication for APP-C1 226*a* is proxied via a first sidecar container ("SIDE-C1") 228*a*. The first sidecar container 228*a* is responsible for the NAT traversal procedures and security establishment (e.g., TLS or VPN) to the second sidecar container ("SIDE-C2") 228*b* located in Edge Cloud 2 220*b* (which also includes a second init container ("INIT-C2") 224*b* and a second application container ("APP-C2") 226*b*. The M-ORCH 210 can initiate the interconnection of APP-C1 226*a* and APP-C2 226*b* by requesting E-ORC1 222*a* and E-ORC2 222*b* to interconnect the APP-Cs 226*a-b*.

In some examples, the two edge clouds 220*a-b* learn about the location of each other because the sidecars 228*a-b* communicate location information via edge orchestrators 222*a-b* that further disseminate the information via the master orchestrator 210 (e.g., could be either event-based information via a Kubernetes application programming interface ("API") server or direct push/pull based information exchange). A first ICE infrastructure ("ICE-I1") 230*a* and a second ICE infrastructure ("ICE-I2") 230*b* can each include one or more STUN servers (that the sidecars 228*a-b* can query for their public facing address candidate) and optionally one or more TURN servers (that the sidecars 228*a-b* can request for a proxied candidate in the case of a NAT traversal procedure fail). In some examples, ICE-I1 230*a* and ICE-I2 230*b* share the same one or more STUN servers and/or TURN servers.

In some embodiments herein, the term address candidate is used to refer to a transport address that is a potential point of contact for receipt of data. In some examples, an address candidate can be referred to as a candidate or candidate information. Candidates also have properties, for example, their type (e.g., server reflexive, relayed, or host), priority, foundation, and base.

Figure 3:
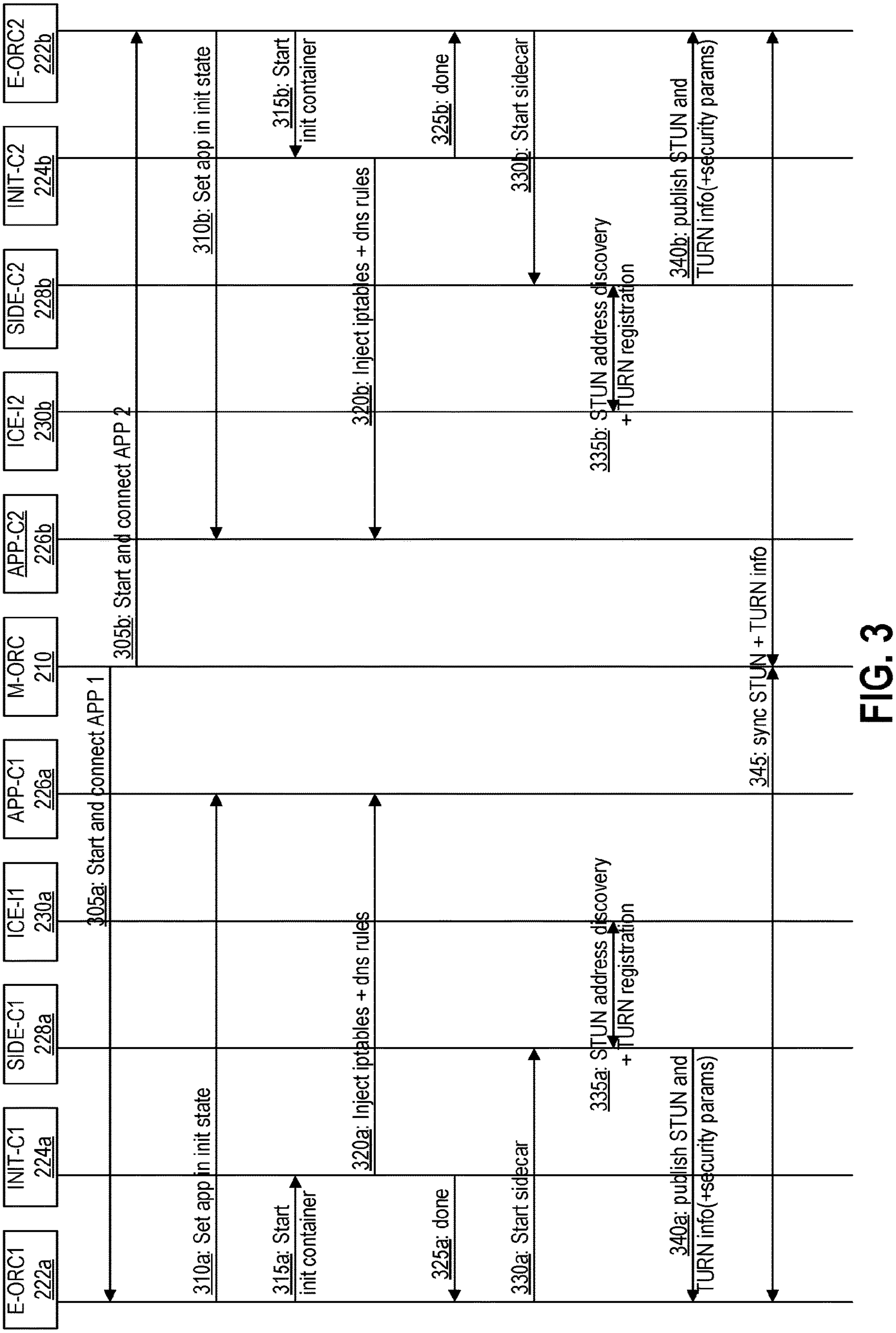
FIG. 3 is a signal flow diagram illustrating an example of a process for setting up secure multicloud connectivity for cloud-native applications according to some embodiments of inventive concepts.
Figure 3:
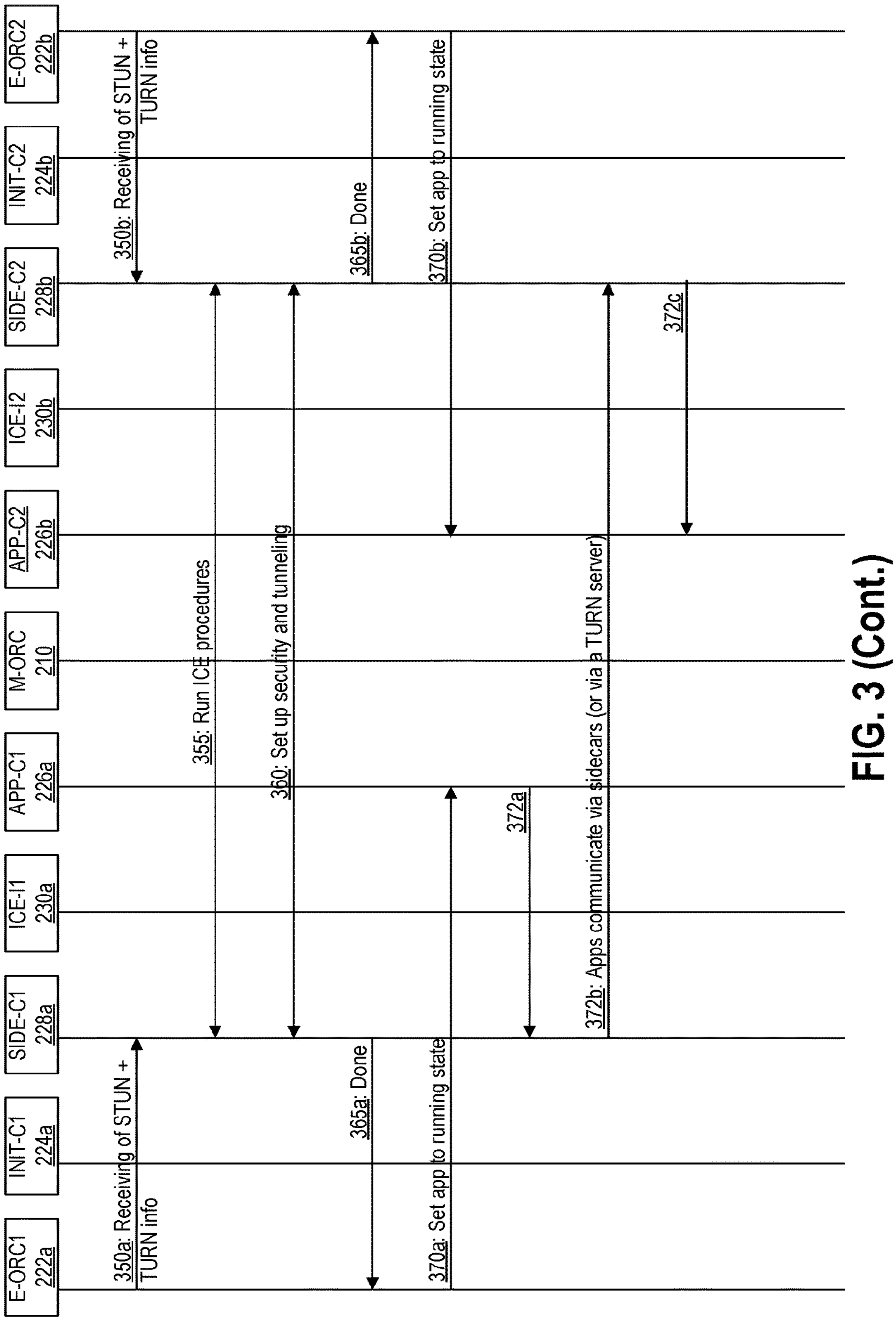

FIG. 3 illustrates an example of a communication flow between edge clouds 220*a-b*. Operations 305*a*, 310*a*, 315*a*, 320*a*, 325*a*, 330*a*, 335*a*, and 340*a* are performed in relation to edge cloud 1 220*a*. Operations 305*b*, 310*b*, 315*b*, 320*b*, 325*b*, 330*b*, 335*b*, and 340*b* are similar to Operations 305*a*, 310*a*, 315*a*, 320*a*, 325*a*, 330*a*, 335*a*, and 340*a* respectively, but are performed in relation to edge cloud 2 220*b*.

At operation 305*a*, the M-ORC 210 contacts E-ORC1 222*a* to deploy APP-C1 226*a* into edge cloud 220*a*, which needs to have connectivity with APP-C2 226*b* (deployed into edge cloud 220*b* via E-ORC2 222*b* in operation 305*b*). In some examples, the application manifest includes implementation specific configuration information for the Kubernetes extension. The exact format of this configuration information is not defined and can be set, for example, with the environment variables in the K8s manifest file. The configuration information can indicate relevant parameters (e.g., ICE and security information).

At operation 310*a*, E-ORC1 222*a* initializes APP-C1 226*a*, but does not set it in a running state.

At operation 315*a*, based on the extra information in the manifest, E-ORC1 222*a* starts INIT-C1 224*a* (an init container within the same pod as APP-C1 226*a*). The extra information can be used to configure INIT-C1 224*a*. For example, INIT-C1 224 can be configured based on an optional key distribution to APP-C1 226*a*. In some embodiments herein, the term key describes an encryption and/or cryptographic key used for cryptographic operations not solely limited to encryption.

At operation 320*a*, INIT-C1 224*a* injects routes and/or iptables rules to APP-C1 226*a* that effectively enforce the traffic of APP-C1 226*a* to traverse via SIDE-C1 228*a* or are used for bypassing the SIDE-C1 228*a* (e.g., the APP-C1 and APP-C2 are able to communicate directly with each other). In some examples, the routes and/or iptable/qdisc rules may apply to all traffic or just the traffic destined to APP-C2 226*b*. Limiting the routes and/or iptable/qdisc rules to just the traffic between APP-C1 226*a* and APP-C2 226*b* can be useful when combining more than two containers, in which case APP-C1 226*a* could be configured to send traffic for APP-C2 226*b* to SIDE-C1 228*a* via another sidecar container. Some other application container in the same pod could also be configured to send at least part of its traffic to either SIDE-C1 228*a* or to the other sidecar container. In additional or alternative examples, INIT-C1 224*a* may inject DNS rules to APP-C1 226*a* so that APP-C1 226*a* can use a DNS name in order to resolve the address of APP-C2 226*b*.

When finished, at operation 325*a*, INIT-C1 224*a* exits with successful status and the E-ORC1 222*a* can proceed.

At operation 330*a*, the E-ORC1 222*a* schedules SIDE-C1 228*a* that M-ORC 210 configured in the manifest (that E-ORC1 222*a* received from M-ORC 210 in operation 305*a*) so that APP-C1 226*a* starts only when SIDE-C1 228*a* is ready. SIDE-C1 228*a* is, in addition to traditional operations, configured to check for NATs and perform NAT traversal operations for APP-C1 226*a*, this includes both the indication that NAT traversal should be completed as well as relevant parameters such as server (e.g., STUN/TURN) addresses. This can be configured using the parameters in the manifest.

At operation 335*a*, SIDE-C1 228*a* looks up its public-side address/port pair it is using by communicating with ICE-I1 230*a* (which can include a STUN server) and, in some examples, registers a TURN-based address used for relaying traffic if the NAT traversal fails.

At operation 340*a*, SIDE-C1 228*a* publishes its public-side address candidates (e.g., STUN and TURN addresses) to E-ORC1 222*a* directly or indirectly (e.g., via Kubernetes API server). In some examples, SIDE-C1 228*a* may do this, for example, via a Kubernetes API server (e.g., event-based information) or using some other directory.

At operation 345, each of the E-ORCs 222*a-b* inform the M-ORC 210 about the address candidates of their respective SIDE-Cs 228*a-b* and each of the E-ORCs 222*a-b* receive a similar set of addresses for connecting to the other APP-C 226*a-b*. For example, E-ORC 222*a* informs the M-ORC 210 about the address candidates of SIDE-C1 228*a* (e.g., addresses for contacting APP-C1 226*a* or a specific cluster when connecting clusters instead of applications) and receives a similar set of addresses for connecting to APP-C2 226*b* that was shared to M-ORC 210 from E-ORC2 222*b*. After operation 345, the M-ORC 210, E-ORC1 222*a* and E-ORC2 222*b* have synchronized information about the address candidates of both clusters.

At operation 350*a*, E-ORC1 222*a* disseminates the address candidates of SIDE-C2 228*b* to SIDE-C1 228*a*. At operation 350*b*, E-ORC2 222*b* disseminates the address candidates of SIDE-C1 228*a* to SIDE-C2 228*b*. After operations 350*a-b*, SIDE-C1 228*a* and SIDE-C2 228*b* have learned each other's address candidates and, at operation 355, they initiate ICE procedures.

At operation 360, the ICE procedures are finished, and the result is either a direct end-to-end route or a triangular route via a TURN server. In some examples, the SIDE-Cs 228*a-b* can now set up a security protocol (e.g., TLS or VPN tunnel) according to the configuration defined in the application manifest (which can define what protocol to use for security and any relevant parameters for the protocol).

At operations 365*a-b*, both SIDE-C 228*a-b* signal to their respective E-ORCs 222*a-b* that they have finished initialization. At operations 370*a-b*, the E-ORCs 222*a-b* set their respective APP-Cs 226*a-b* in a running state.

At operations 372*a-c*, the APP-Cs 226*a-b* communicate with each other indirectly. For example, the application traffic always traverses the sidecar that acts as proxy for the traffic. The sidecars (SIDE-Cs 228*a-b*) communicate with each other either directly over an end-to-end path or via a TURN server in the event that ICE-based NAT traversal failed.

In some examples, since all containers in a pod share the network interface, the application container and sidecar are using the same IP address. Hence, a sidecar just changes the destination port number when it proxies traffic from the application, and, correspondingly, the source port, when the sidecar proxies traffic to the application. Therefore, no IP-over-IP tunneling is needed.

In additional or alternative embodiments, when using a network service mesh ("NSM") framework and/or a future version it is possible to omit the sidecar completely after the NAT traversal procedures because all the containers in the same pod share the same IP address. In some examples, the sidecar would set up a firewall rule (e.g., Linux iptables rule) in the pod to forward all traffic to/from the port of the sidecar to the application container. This can require two NAT rules: one for incoming and another for outgoing traffic. A benefit of this includes a smaller latency because the sidecar is not proxying the traffic.

In additional or alternative examples, Teredo can be used in the sidecars as an alternative to ICE for NAT traversal. In this case, APP-C would need to support IPv6, but connectivity between sidecars would be based on IPV6 tunneling over IPv4 (as specified in RFC4380), i.e. IP-over-IP tunneling is needed.

In some embodiments, the connection between the sidecars is secured based on the application manifest. The security could be based on TLS, IPsec, QUIC (tunneled or non-tunneled) or something else (e.g., VPN+NAT traversal coupled as specified in RFC5770 or draft-ietf-hip-native-nat-traversal-32). In additional or alternative embodiments, the connection between the application containers can be secured end-to-end. For example, in regard to the example of FIG. 3, at operations 305*a-b*, the M-ORC 210 could indicate the security requirements for the interconnection of the two sidecars (SIDE-Cs 228*a-b*), or even directly to the application containers (APP-Cs 226*a-b*) if full end-to-end security is needed. In some examples, the ICE/STUN/TURN protocols include a username-password authentication that is handled in the sidecars (with the credentials originating from the E-ORC or M-ORC).

In additional or alternative embodiments, for full end-to-end security, two options exist (symmetric and asymmetric keys). Symmetric keys can be generated and provisioned by M-ORC 210 so that both applications 226*a-b* would end up with the same shared secret. In this example, the shared secret would be provided in operations 305*a-b* to each of the E-ORCs 222*a-b*. Asymmetric keys can be generated by M-ORC 210, E-ORCs 222*a-b*, APP-Cs 226*a-b*, INIT-Cs 224*a-b*, or SIDE-C. If generated by M-ORC 210, the keys can be provided by M-ORC 210 to each of the E-ORCs 222*a-b* in operations 305*a-b*. If the keys are not generated by the M-ORC 210, the M-ORC 210 may indicate and/or instruct (e.g., via a manifest file or other signaling) an entity to generate the keys. If APP-C 226*a* generate the key pair, it would be used in a leap of faith fashion because the public key would not be known to the peer APP-C 226*b*.

In additional or alternative embodiments, for full end-to-end security, at operations 310*a-b*, when initializing APP-Cs 226*a-b*, E-ORCs 222*a-b* can provide the key(s) (generated by E-ORC 222*a-b* itself or M-ORC 210) to APP-C 226*a-b*. If APP-C 226*a-b* generates the keys itself, this could be configured/indicated during initialization of the container together with an indication that security should be used.

In additional or alternative embodiments, for full end-to-end security, at operations 315*a-b*, 320*a-b*, and 325*a-b* of FIG. 3, if the M-ORC 210 or E-ORC 222*a-b* has generated the key(s), the E-ORCs 222*a-b* can provide the key(s) to INIT-Cs 224*a-b* at operation 315*a-b*, and to APP-Cs 226*a-b* at operation 320*a-b*. In an alternative example, as part of operation 320*a-b*, the INIT-Cs 224*a-b* each generate an asymmetric key pair for their respective APP-C 226*a-b* and provision it. For example, the INIT-Cs 224*a-b* communicate the associated public key back to their respective E-ORCs 222*a-b* at operation 325*a-b*. In an alternative example, if one of the APP-Cs 226*a-b* is to generate the keys itself, this could be configured/indicated by its respective INIT-C 224*a-b* at operation 320*a-b* together with an indication that security should be used (if not indicated in operation 310*a-b*).

In additional or alternative embodiments, for full end-to-end security, at operations 330*a-b* the E-ORC 222*a-b* can provide security requirements to its respective SIDE-C 228*a-b* (e.g., related to protecting traffic between the sidecars instead of between the application containers). This security requirements can include credentials generated by the M-ORC 210 or the respective E-ORC 222*a-b*. In additional or alternative embodiments, there could be an indication that SIDE-C 228*a-b* should generate the key pair.

In additional or alternative embodiments, for full end-to-end security, at operations 340*a-b*, if SIDE-C 228*a-b* has generated the key pair, it provides the public key together with the address information to its respective E-ORC 222*a-b*.

In additional or alternative embodiments, for full end-to-end security, at operations 345 and 350*a-b*, if keys were not generated by M-ORC 210 then the E-ORCs 222*a-b* can exchange keys and other relevant security parameters with each other. The parameters/keys of the peer E-ORC can be provisioned to their respective sidecars.

In additional or alternative embodiments, for full end-to-end security, at operation 360 the keys and security parameters are used for establishing a secure connection between the sidecars.

In additional or alternative embodiments, for full end-to-end security, at operations 370*a-b*, if APP-C 226*a-b* is to generate the keys itself, this could occur when the corresponding E-ORC 222*a-b* sets the container to the running state, if not done earlier.

In additional or alternative embodiments, for full end-to-end security, at operations 372*a-c*, the applications start the communication using end-to-end security based on the credentials, either shared between the applications or, if not (i.e. applications have generated their respective asymmetric key pairs, but public keys have not been shared between the applications beforehand), then the security would be based on leap of faith.

In some embodiments, the security-related examples described above can be performed to interconnect two applications in different edge clouds. For example, the above examples can be repeated for each application pair.

In additional or alternative embodiments, as an optimization to securely interconnecting two APP-Cs in a NATed environment as discussed above, the edge clouds can implement gateway ("GW") functionality for interconnecting clusters, pods, or full edge clouds with each other. In some examples, the edge clouds run their dedicated GWs that run the described NAT traversal procedure in order to establish a direct (or relayed) connection between the clusters/pods/edges. After this, an APP-C can send traffic (e.g., as configured by an init container) via its sidecar destined to the other cluster/pod/edge via a GW that has taken care of the NAT traversal and established a connection between the clusters/pods/edges. Thus, traffic from all applications in one cluster/pod/edge destined to some application(s) in another cluster/pod/edge can go through the same tunnel set up between the respective GWs. A GW would have to encapsulate the original "inner" packet with an external UDP and IP header to be used for routing the packets to another GW. Received packets can be decapsulated and resulting inner packet sent to the destination application. These can be forwarded to the intended target application container.

In some embodiments, the process for interconnecting clusters/pods/edges can provide performance benefits as the NAT traversal procedure has only to be repeated once for each cluster/pod/edge pair, instead of repeating it for each application pair.

In some examples, a host-based approach is provided. In the host-based approach, the behavior can be different after the M-ORC schedules more than two containers into two edge clouds, belonging to the same tenant. In the clusters with multiple containers, the M-ORC tries to schedule the app containers to the same pair of host machines as on the previous round. Then the already running sidecar container can directly be reused as the app containers are running in the same pod (e.g., the Init container associates the routes of the container with an existing sidecar and notifies the sidecar about this). If scheduling to the exact same set of hosts is not possible, then new sidecars will be created on both sides as depicted earlier.

In additional or alternative examples, a tenant-based approach is provided. In the tenant-based approach, the master orchestrator initiates the NAT traversal procedures for a gateway (instead of side container) only once in each cluster to be connected. When an application is launched, the sidecar does not initiate NAT traversal procedures but rather routes packet to the gateway when the traffic is destinated to another cluster. It is possible to handle the NAT traversal procedures before the tenant has started any application containers. Since the GWs are under very heavy load, some hardware optimizations may be needed, and IP tunneling may be needed in the form of a (VPN) tunnel between the gateways.

In additional or alternative examples, a cluster-based approach is provided in which gateways are performing NAT traversal. In the cluster-based approach, the gateway is not tenant specific but rather cluster specific. In this approach, the traffic of the tenants is not separated at the gateway but rather delivered between clusters using the same virtual private network ("VPN") tunnel established between the gateways, so the sidecars may have to apply some transport layer security ("TLS") among themselves in order protect the traffic of the tenant. This approach can require even more from the underlying hardware than the previous approach.

In some embodiments, while virtual machines "migrate" from a network to another, cloud-native containers, in general, do not. Instead, cloud-native containers are usually assumed to be stateless, so they can be terminated and started when moving them. So, the assumption here would be that when a container is moved from one cluster to another, the instance would be terminated and started in the destination cluster. Hence, the operations illustrated in FIG. 3 may be repeated upon movement (unless, for example, one of the above optimizations is in place).

Various embodiments described herein allow connecting of containers in two (or more) Kubernetes edge clusters together in a secure way, across layered NATs.

Operations of an edge node 500 (implemented using the structure of the block diagram of FIG. 5) will now be discussed with reference to the flow chart of FIG. 6 according to some embodiments of inventive concepts. For example, modules may be stored in memory 505 of FIG. 5, and these modules may provide instructions so that when the instructions of a module are executed by respective network node processing circuitry 503, processing circuitry 503 performs respective operations of the flow charts.

Figure 6:
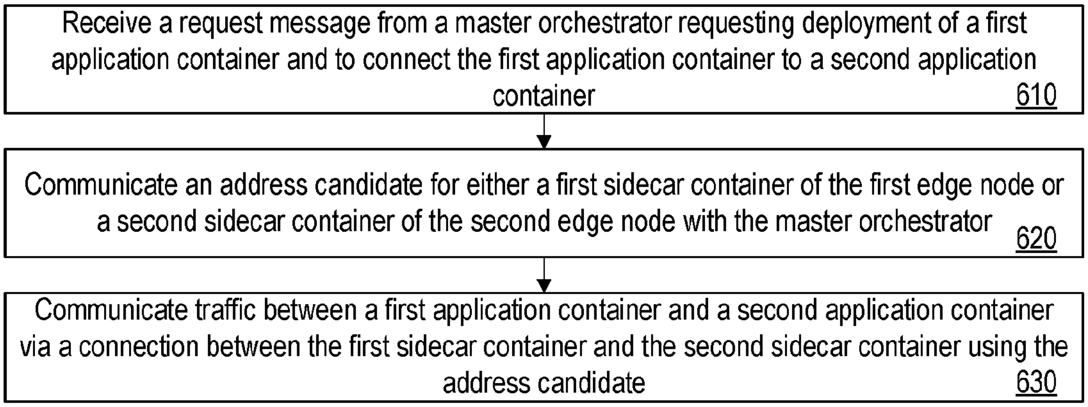
FIG. 6 is a flow chart illustrating examples of operations performed by a first edge node according to some embodiments of inventive concepts.

In FIG. 6, a process of operating a first edge node in a communications network that includes a master orchestrator and a second edge node is illustrated.

At block 610, processing circuitry 503 receives, via network interface 507, a request message from the master orchestrator requesting deployment of the first application container and to connect the first application container to the second application container via the first sidecar container. In some embodiments, the request message includes configuration information. The configuration information can indicate that the first application container be connected to the second application container using an interactive connectivity establishment, ICE, procedure.

At block 620, processing circuitry 503 communicates, via network interface 507, an address candidate for either a first sidecar container of the first edge node or a second sidecar container of the second edge node with the master orchestrator.

In additional or alternative embodiments, communicating the address candidate includes transmitting a first address candidate for the first sidecar container to the master orchestrator. In additional or alternative embodiments, the first address candidate includes a public address of the first sidecar container. Transmitting the first address candidate further includes determining, by the first sidecar container, a public address of the first sidecar container by communicating with a Session Traversal of User Datagram Protocol through Network Address Translated, STUN, server.

In additional or alternative embodiments, the first address candidate includes an address of a Traversal Using Relays around Network Address Translated, TURN, server.

In additional or alternative embodiments, communicating the address candidate includes receiving a second address candidate for the second sidecar container from the master orchestrator.

In additional or alternative embodiments, the address candidate includes a list of address candidates communicated with the master orchestrator. In some examples, communicating the address candidate includes transmitting a first list of address candidates for the first sidecar container to the master orchestrator. In additional or alternative examples, communicating the address candidate includes receiving a second list of address candidates for the second sidecar container from the master orchestrator.

At block 630, processing circuitry 503 communicates, via network interface 507, traffic between a first application container of the first edge node and a second application container of the second edge node via a connection between the first sidecar container and the second sidecar container using the address candidate.

In some embodiments, communicating the traffic between the first application container and the second application container includes receiving, by the first sidecar container, the traffic from the second application container via the second sidecar container using the first address candidate and providing, by the first sidecar container, the traffic to the first application container. In additional or alternative embodiments, when the first address is a public address of the first sidecar container, receiving the traffic from the second application container includes receiving the traffic directly from the second sidecar container at the public address of the first sidecar container.

In some embodiments herein, public address may be used to refer to a server reflexive candidate or a relayed candidate. A server reflexive candidate can be used to refer to a candidate whose IP address and port are bindingly allocated by a NAT for a sidecar when it sent a packet through the NAT to a STUN server. A sidecar container can learn the server reflexive candidates from STUN servers using a binding request, or from TURN servers, which provide both a relayed and a server reflexive candidate. In additional or alternative embodiments, besides server reflexive and relayed candidates, other candidates (e.g., host candidate and peer reflexive) are also collected by the sidecar and are communicated to the peer sidecar.

In additional or alternative embodiments, the first address candidate includes an address of a Traversal Using Relays around Network Address Translated, TURN, server, and receiving the traffic from the second application container includes, in response to a Network Address Translated, NAT, traversal failure, receiving the traffic from the second sidecar container via the TURN server.

In additional or alternative embodiments, communicating the traffic between the first application container and the second application container includes transmitting, by the first sidecar container, the traffic from the first application container to the second application container via the second sidecar container using the second address candidate. In some examples, the second address candidate includes a public address of the second sidecar container and transmitting the traffic to the second application container includes transmitting the traffic directly to the public address of the second sidecar container. In additional or alternative examples, the second address candidate includes an address (also referred to herein as a relayed candidate) of a Traversal Using Relays around Network Address Translated, TURN, server, and transmitting the traffic to the second application container includes, in response to a Network Address Translated, NAT, traversal failure, transmitting the traffic to the second sidecar container via the TURN server.

In additional or alternative embodiments, in response to communicating the address candidate for either the first sidecar container or the second sidecar container, processing circuitry 503 performs an interactive connectivity establishment, ICE, procedure. In additional or alternative embodiments, in response to communicating the address candidate for either the first sidecar container or the second sidecar container, processing circuitry 503 sets up and secures tunneling between the first sidecar container and the second sidecar container.

In additional or alternative embodiments, the configuration information received at block 610 indicates an entity (e.g., a container or a orchestrator) of the first edge node responsible for generating a cryptographic key material and associated parameters (also referred to herein as an encryption key) for the traffic. Communicating the address candidate at block 620 further includes transmitting the encryption key to the master orchestrator, and communicating the traffic between the first application container and the second application container at block 630 further includes communicating over a connection secured based on the cryptographic key material and associated parameters or communicating the traffic using the encryption key for encryption and/or decryption of the traffic.

In additional or alternative embodiments, the request message received at block 610 includes an encryption key and communicating the traffic between the first application container and the second application container at block 630 includes communicating over a connection secured based on the cryptographic key material and associated parameters or communicating the traffic using the encryption key for encryption and/or decryption of the traffic.

Various operations of FIG. 6 may be optional. For example, in some embodiments block 610 may be optional.

Operations of a master orchestrator 400 (implemented using the structure of the block diagram of FIG. 4) will now be discussed with reference to the flow chart of FIG. 7 according to some embodiments of inventive concepts. For example, modules may be stored in memory 405 of FIG. 4, and these modules may provide instructions so that when the instructions of a module are executed by respective network node processing circuitry 403, processing circuitry 403 performs respective operations of the flow chart.

Figure 7:
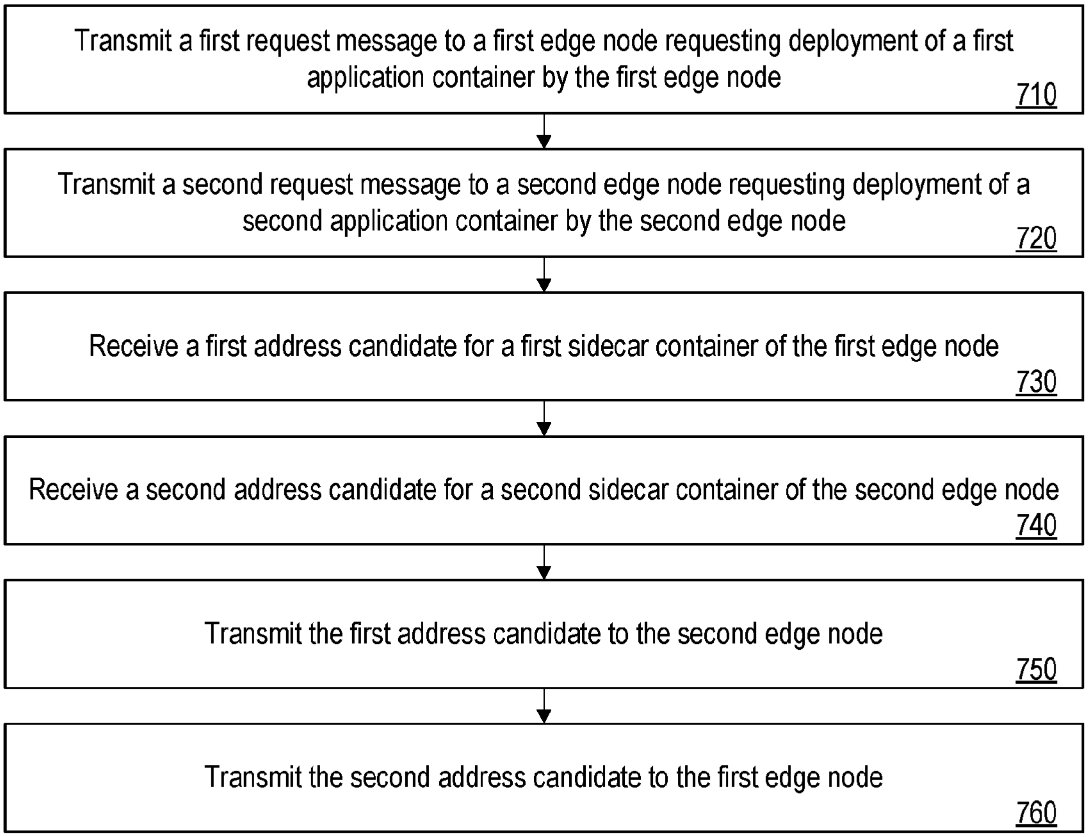
FIG. 7 is a flow charts illustrating examples of operations performed by a master orchestrator according to some embodiments of inventive concepts.

FIG. 7 illustrates an example of a process of operating a master orchestrator in a communications network that includes a first edge node and a second edge node.

At block 710, processing circuitry 403 transmits, via network interface 407, a first request message to a first edge node. The first request message can request deployment of a first application container by the first edge node.

At block 720, processing circuitry 403 transmits, via network interface 407, a second request message to a second edge node. The second request message requests deployment of a second application container by the second edge node. The first request message and the second request message further request that the first application container and the second application container are connected.

In some embodiments, the first request message and the second request message each include configuration information. In some examples, the configuration information indicates that the first application container and the second application container be connected via the first sidecar container and the second sidecar container using an interactive connectivity establishment, ICE, procedure.

In additional or alternative embodiments, the first request message and the second request message each include a key to be used for the communication. For example, the key can be an encryption key to be used for cryptographic operations.

At block 730, processing circuitry 403 receives, via network interface 407, a first address candidate for a first sidecar container from the first edge node. At block 740, processing circuitry 403 receives, via network interface 407, a second address candidate for a second sidecar container from the second edge node.

In some embodiments, the first address candidate includes a public address of the first sidecar container and/or the second address candidate includes a public address of the second sidecar container.

In additional or alternative embodiments, the first address candidate and/or the second address candidate further includes a relayed candidate allocated by a Traversal Using Relays around Network Address Translated, TURN, server. In some embodiments herein, the term relayed candidate is used herein to refer to an address candidate that is obtained by sending a TURN Allocate request from a host candidate to a TURN server. The relayed candidate is resident on the TURN server, and the TURN server relays packets back towards the sidecar.

At block 750, processing circuitry 403 transmits, via network interface 407, the first address candidate to the second edge node. At block 760, processing circuitry 403 transmits, via network interface 407, the second address candidate to the first edge node.

In some embodiments, the configuration information described above at block 720 indicates a container of each edge node responsible for generating an encryption key for traffic between the first application container and the second application container. Receiving the first address candidate includes receiving a first encryption key. Receiving the second address candidate includes receiving a second encryption key. Transmitting the first address candidate includes transmitting the first encryption key to the second edge node. Transmitting the second address candidate includes transmitting the second encryption key to the first edge node.

Various operations of FIG. 7 may be optional. For example, in some embodiments blocks 710 and 720 may be optional.

In some embodiments, the operations in FIGS. 6-7 are implemented using a Kubernetes or Federated Kubernetes Operator reconciliation loop.

Explanations are provided below for various abbreviations/acronyms used in the present disclosure.

| Abbreviation | Explanation |
|---|---|
| ICE | Interactive Connectivity Establishment protocol |
| NAT | Network Address Traversal |
| STUN | Session Traversal Utilities for NAT |
| TURN | Traversal Using Relays around NAT |
| VPN | Virtual Private Networking |
| TOSCA | Topology and Orchestration Specification for Cloud Applications |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a first edge node in a communications network that includes a master orchestrator and a second edge node, the method comprising:
- communicating an address candidate for either a first sidecar container of the first edge node or a second sidecar container of the second edge node with the master orchestrator; and
- communicating traffic between a first application container of the first edge node and a second application container of the second edge node via a connection between the first sidecar container and the second sidecar container using the address candidate.

2. The method of claim 1, wherein communicating the address candidate comprises transmitting a first address candidate for the first sidecar container to the master orchestrator, and wherein communicating the traffic between the first application container and the second application container comprises:
- receiving, by the first sidecar container, the traffic from the second application container via the second sidecar container using the first address candidate; and
- providing, by the first sidecar container, the traffic to the first application container.

3. The method of claim 2, wherein the first address candidate comprises a public address of the first sidecar container,
- wherein transmitting the first address candidate further comprises determining, by the first sidecar container, a server reflexive candidate of the first sidecar container by communicating with a Session Traversal of User Datagram Protocol through Network Address Translated, STUN, server, and wherein receiving the traffic from the second application container comprises receiving the traffic directly from the second sidecar container at the server reflexive candidate of the first sidecar container.

4. The method of claim 3, wherein the first address candidate comprises a relayed candidate of a Traversal Using Relays around Network Address Translated, TURN, server, and wherein receiving the traffic from the second application container comprises, in response to a Network Address Translated, NAT, traversal failure, receiving the traffic from the second sidecar container via the TURN server.

5. The method of claim 1, wherein communicating the address candidate comprises receiving a second address candidate for the second sidecar container from the master orchestrator, and wherein communicating the traffic between the first application container and the second application container comprises transmitting, by the first sidecar container, the traffic from the first application container to the second application container via the second sidecar container using the second address candidate.

6. The method of claim 5, wherein the second address candidate comprises a server reflexive candidate of the second sidecar container, and wherein transmitting the traffic to the second application container comprises transmitting the traffic directly to the server reflexive candidate of the second sidecar container.

7. The method of claim 5, wherein the second address candidate comprises a relayed candidate allocated by a Traversal Using Relays around Network Address Translated, TURN, server, and wherein transmitting the traffic to the second application container comprises, in response to a Network Address Translated, NAT, traversal failure, transmitting the traffic to the second sidecar container via the TURN server.

8. The method of claim 1, further comprising:

receiving a request message from the master orchestrator requesting deployment of the first application container and to connect the first application container to the second application container via the first sidecar container.

9. The method of claim 8, wherein the request message comprises configuration information, the configuration information indicating that the first application container be connected to the second application container using an interactive connectivity establishment, ICE, procedure.

10. The method of claim 9, wherein the configuration information indicates an entity of the first edge node responsible for generating cryptographic key material and associated parameters for the traffic, wherein communicating the address candidate further comprises transmitting the cryptographic key material and associated parameters to the master orchestrator, and wherein communicating the traffic between the first application container and the second application container comprises communicating the traffic over a connection secured based on the cryptographic key material and associated parameters.

11. The method of claim 8, wherein the request message comprises a cryptographic key material and associated parameters, and wherein communicating the traffic between the first application container and the second application container comprises communicating the traffic over a connection secured based on the cryptographic key material and associated parameters.

12. The method of claim 1, wherein communicating the traffic further comprises:

in response to communicating the address candidate for either the first sidecar container or the second sidecar container, performing an interactive connectivity establishment, ICE, procedure; and in response to communicating the address candidate for either the first sidecar container or the second sidecar container, setting up securing and tunneling between the first sidecar container and the second sidecar container.

13. A method of operating a master orchestrator in a communications network that includes a first edge node and a second edge node, the method comprising:

receiving a first address candidate for a first sidecar container from the first edge node;

receiving a second address candidate for a second sidecar container from the second edge node;

in response to receiving the first address candidate, transmitting the first address candidate to the second edge node; and in response to receiving the second address candidate, transmitting the second address candidate to the first edge node.

14. The method of claim 13, further comprising:

transmitting a first request message to the first edge node, the first request message requesting deployment of a first application container by the first edge node; and transmitting a second request message to the second edge node, the second request message requesting deployment of a second application container by the second edge node, the first request message and the second request message further requesting that the first application container and the second application container be connected.

15. The method of claim 14, wherein the first request message and the second request message each comprise configuration information, the configuration information indicating that the first application container and the second application container be connected via the first sidecar container and the second sidecar container using an interactive connectivity establishment, ICE, procedure.

16. The method of claim 15, wherein the configuration information indicates a container of each edge node responsible for generating a cryptographic key material and associated parameters for traffic between the first application container and the second application container, wherein receiving the first address candidate comprises receiving a first cryptographic key, wherein receiving the second address candidate comprises receiving a second cryptographic key, wherein transmitting the first address candidate comprises transmitting the first cryptographic key to the second edge node, and wherein transmitting the second address candidate comprises transmitting the second cryptographic key to the first edge node.

17. The method of claim 14, wherein the first request message and the second request message each comprise a cryptographic key material and associated parameters.

18. The method of claim 13, wherein the first address candidate comprises a public address of the first sidecar container.

19. The method of claim 18, wherein the first address candidate further comprises an address of a Traversal Using Relays around Network Address Translated, TURN, server.

20. A first edge node in a communications network that includes a master orchestrator and a second edge node, the first edge node comprising:

processing circuitry; and memory coupled with the processing circuitry, wherein the memory includes instructions that when executed by the processing circuitry causes the first edge node to perform operations of:

communicating an address candidate for either a first sidecar container of the first edge node or a second sidecar container of the second edge node with the master orchestrator; and communicating traffic between a first application container of the first edge node and a second application container of the second edge node via a connection between the first sidecar container and the second sidecar container using the address candidate.

21. A non-transitory storage medium including program code which, when executed by processing circuitry of a first edge node in a communications network that includes a master orchestrator and a second edge node, causes the first edge node to perform operations of:

communicating an address candidate for either a first sidecar container of the first edge node or a second sidecar container of the second edge node with the master orchestrator; and communicating traffic between a first application container of the first edge node and a second application container of the second edge node via a connection between the first sidecar container and the second sidecar container using the address candidate.

22. A master orchestrator in a communications network that includes a first edge node and a second edge node, the master orchestrator comprising:

processing circuitry; and memory coupled with the processing circuitry, wherein the memory includes instructions that when executed by the processing circuitry causes the master orchestrator to perform operations of:

receiving a first address candidate for a first sidecar container from the first edge node;

receiving a second address candidate for a second sidecar container from the second edge node;

in response to receiving the first address candidate, transmitting the first address candidate to the second edge node; and in response to receiving the second address candidate, transmitting the second address candidate to the first edge node.

23. A non-transitory storage medium including program code which, when executed by processing circuitry of a master orchestrator in a communications network that includes a first edge node and a second edge node, causes the master orchestrator to perform operations of:

receiving a first address candidate for a first sidecar container from the first edge node;

receiving a second address candidate for a second sidecar container from the second edge node;

in response to receiving the first address candidate, transmitting the first address candidate to the second edge node; and in response to receiving the second address candidate, transmitting the second address candidate to the first edge node.

* * * * *